Nov. 26, 1963     T. LAUFER     3,111,993

ROTARY WING WITH JET PROPULSION

Filed Jan. 29, 1962

INVENTOR.
THEODOR LAUFER.
BY K.A. Mayr
ATTORNEY.

United States Patent Office 3,111,993
Patented Nov. 26, 1963

3,111,993
ROTARY WING WITH JET PROPULSION
Theodor Laufer, Friedrichshafen, Germany, assignor to Dornier-Werke G.m.b.H., Friedrichshafen, Germany, a German firm
Filed Jan. 29, 1962, Ser. No. 169,415
Claims priority, application Germany Feb. 3, 1961
8 Claims. (Cl. 170—135.4)

This invention relates to a jet propelled rotary wing and more particularly to a helicopter rotor blade having jet propulsion means for causing rotation.

In conventional jet propulsion arrangements for causing rotation of helicopter rotor blades the propellant gas originates in relatively small units mounted on the tips of the rotor blades, or air is compressed or a gas is produced or generated in a central unit and conducted through conduits to the rotor blades. In the latter case, the gas or compressed air is fed through rotor blades of hollow construction to jets located at the tips of the rotor blades. The present invention is concerned with rotor blades of the latter type.

In propelling a helicopter by cold or preheated gas or compressed air from a central gas producing unit, means may be provided to effect additional combustion at the rotor blade tips. The passage of the gas or compressed air through the rotor blade to the rotor blade tips, however, presents a number of problems. Usually the spar of the rotor blade is used for conducting the propellant gas. In many cases the spar of the rotor blade is constructed as an integral part of the leading or front section of the rotor blade while a lighter trailing or rear section is attached to the front section. In such a construction the propellant gas, in passing through a hollow passageway in the front section of the blade, is subjected to considerable cooling involving loss of heat energy as the blade passes through the atmosphere at high velocity. The heat energy loss is especially high when the helicopter is operating in a damp environment as, for example, in rain, fog, or snow.

Another problem encountered in these type blades is the danger of icing up of the rotor blades. If the propellant fluid conducted through the hollow rotor blade is heated too much, any ice formed on the outside of the blade will be melted by the hot propellant gas and the water thus formed will run to the trailing or rear section of the blade. Since the propellant gas is conducted through a passageway located in the forward section of the blade, the water thus formed will freeze as it runs on to the rear section since there is no passageway containing heated gases in the rear section.

Still another problem is encountered in the area where the front section of the rotor blade joins the rear section. Since there is little or no circulation of air in this area, there is a tendency for the hot propellant gases passing through the front section of the rotor blade to cause undesirable heating in the juncture area. This heat may damage the rear section of the blade and the holding means used for securing the rear section to the front section.

In the past helicopters have been constructed to avoid the above problems by using an unheated propellant gas in the passageway in the rotor blades.

It is an object of the present invention to avoid and overcome the foregoing and other difficulties of and objections to prior art practices by the provision of an improved rotor blade which is able to conduct a hot propellant gas.

Another object of the present invention is the provision of an improved rotor blade driven by reaction forces produced by expanding hot gases wherein an insulated passageway for conducting a propellant gas is provided affording use of gases preheated to a considerably high temperature.

Still another object of the present invention is the provision of an improved rotor blade driven by reaction forces produced by expanding hot, high pressure gases wherein an insulated gas passageway of variable thickness insulation is provided affording use of gases of considerably high pressure.

Yet another object of the present invention is the provision of an improved rotor blade driven by reaction forces produced by expanding hot, high pressure gases wherein an insulated gas passageway of constant cross-sectional area is provided causing a minimum of gas flow resistance.

The aforesaid objects of the present invention and other objects which will become apparent as the description proceeds are achieved by providing insulation material of varying thickness along the inside of the passageway used for conducting propellant gas to the tips of the rotor blades.

For a better understanding of the present invention reference should be had to the accompanying drawings wherein.

Although the principles of the present invention are broadly applicable to a rotary wing, the present invention is particularly adapted for use in helicopter blades and hence it has been so illustrated and will be so described.

Figure 1:
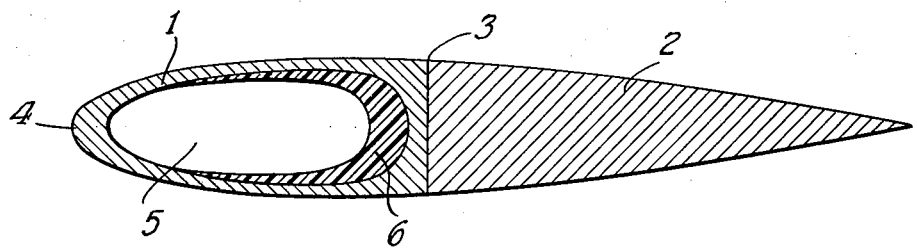
FIG. 1 is a cross sectional view of a rotor blade according to the present invention, showing the hollow passageway for conducting propellant gases and the insulation in the passageway.

As shown in FIG. 1, the leading or front section 1 of the rotor blade is constructed integrally with the leading edge 4. The front section 1 contains a passageway 5 for conducting propellant gas to jet propulsion units located at the tip of the rotor blade. Attached to the front section 1 at the juncture 3 is the trailing or rear section assembly 2 whereby these two sections make up a cross section of the rotor blade.

The passageway 5 in the front section 1 is provided with insulating material 6 of varying thickness. As can be seen in FIG. 1, the thickness of the insulating material varies along different cross sectional portions of the passageway 5. The wall thickness of the insulation is at a maximum at the rear portion of the passageway 5 and gradually decreases to a minimum at the forward portion. The insulation may be absent at the extreme forward portion of the passageway as shown in FIG. 1. With the insulation material distributed as above described, the maximum protection against heat from the hot gases in the passageway 5 is afforded the juncture 3 and the rear portion of the front section 1 of the rotor blade. As mentioned earlier, this is the area where there is the least dissipation of heat to the surrounding atmosphere because the surrounding atmosphere is prevented from circulating past the surfaces in this area. By the use of insulation as above described, it is possible to pass high pressure and preheated gases through the passageway 5 without causing dangerous overheating in the area where the front section 1 of the rotor blade joins the rear section 2. This is specially useful if the rear section 2 of the rotor blade is bolted or glued to the forward section 1.

Since the velocity of the blade tips is greater than the velocity of the inner or longitudinal central portion of the rotor blade, the tips of the blade will be subjected to greater cooling by the surrounding atmosphere so that there will be less danger of overheating at the blade tip than in other longitudinal sections of the blade. Therefore, the thickness of the insulating material at the rear portion of the passageway 5 is at its greatest near the inner or central longitudinal section of the blade and may gradually decrease in thickness as the blade tip is approached.

The main reason for the insulation at the upper and lower surfaces of the passageway 5 is to reduce the heat loss due to the cooling effect of the blade's rotation in the atmosphere. Since the cooling effect is greater at the blade tips than at the rotor hub, the insulation on the upper and lower surfaces of the passageway 5 will be thinner at the rotor hub and increase gradually as the rotor tip is approached.

Figure 2:
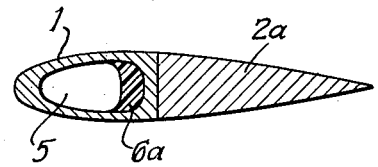
FIG. 2 is a cross sectional view of the rotor blade near the hub.
Figure 2A:
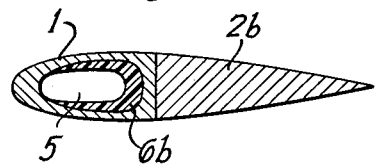
FIG. 2a is a cross sectional view of the rotor blade at the longitudinal center portion of the blade.
Figure 2B:
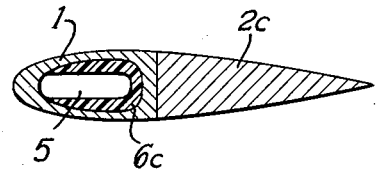
FIG. 2b is a cross sectional view of the rotor blade near the tip of the blade.

The different thicknesses of the insulating material at various points along the rotor blade are shown in FIGS. 2, 2a and 2b. In FIG. 2, which is a cross section of the rotor blade near the hub, relatively thick insulation 6a is used at the rear of the passageway 5 while practically none is provided at the upper and lower surfaces. In FIG. 2a, which is a cross section of the rotor blade at a central longitudinal location, the thickness of the insulation 6b at the rear of the passageway 5 is less than that in FIG. 2 while a thin layer is provided on the upper and lower surfaces. Finally, in FIG. 2b, which is a cross section near the blade tips, the insulation 6c at the rear of the passageway 5 is thinner than in FIG. 2a while the insulation on the upper and lower surfaces is thicker than the corresponding thickness in FIG. 2a.

As shown in the drawings, there is no insulation at the forward portion of the passageway 5 along the longitudinal length of the blade. This is possible for deicing at low pressures and without preheating of the gas. For high pressures and considerable preheating, however, a certain thickness of the insulation wall may be required.

The variation of thickness of the insulating material along different longitudinal sections of the blade as described above makes it possible for the passageway 5 to have an equal cross sectional area along its entire longitudinal length. Thus there is a minimum pressure drop through the passageway 5 since there is no decrease in cross sectional area to cause an additional pressure loss.

Any suitable insulating material having a smooth surface may be used for this purpose such as, for example, a fluorine base plastic.

While in accordance with the patent statutes one best known embodiment of the present invention has been illustrated and described, it is to be understood that the invention may be varied in construction within the scope of the claims.

I claim:

1. In a rotor blade for a rotary wing aircraft:
   conduit means extending inside and longitudinally of the rotor blade for conducting a heated gas,
   said conduit means having an upper surface, a lower surface, and a rear surface, and
   heat insulating means placed on said surfaces,
   the thickness of said insulating means on said upper and lower surfaces continuously increasing in the longitudinal direction of said conduit means, and the thickness of said insulating means on said rear surface continuously decreasing in the same longitudinal direction of said conduit means in which direction the thickness of the insulating means on said upper and lower surfaces increases.

2. In a rotor blade as defined in claim 1 and wherein said insulating means is placed inside said conduit means and has an interior surface exposed to the gases passing through said conduit means, the entire extent of said interior surface being continuous and plane.

3. In a rotor blade as defined in claim 1 wherein said insulating means is made of a fluorine base plastic.

4. In a rotor blade as defined in claim 1 and wherein the thickness of said heat insulating means is greatest on said rear surface in any cross section of said conduit means.

5. In a rotor blade as defined in claim 1 and wherein the thickness of said heat insulating means on said upper and lower surfaces gradually decreases in the direction of rotation of the rotor blade.

6. A rotor blade for a rotary wing aircraft, comprising:
   a longitudinally extending leading member,
   a longitudinally extending trailing member,
   means for securing said longitudinally extending members together,
   a passageway in said leading member extending inside and longitudinally of said leading member for conducting a heated gas through said leading member in the longitudinal direction thereof, said passageway having an upper interior surface, a lower interior surface, and a rear interior surface, and
   heat insulating means placed on said surfaces,
   the thickness of said insulating means on said upper and lower surfaces continuously increasing in the longitudinal direction of said leading member, the thickness of said insulating means on said rear surface continuously decreasing in the same longitudinal direction of said leading member in which direction the thickness of the insulating means on said upper and lower surfaces increases.

7. In a rotor blade for use on rotary wing aircraft of the type having a central gas producing unit, the combination comprising a longitudinally extending member suitable as a rotor blade for a rotary wing aircraft, means on said member for driving the member along a rotary path, said member having a passageway for conducting a heated gas between said gas producing unit and said means, and insulating means for reducing the loss of heat from the gases passing through said passageway, said insulating means being absent at that portion of the passageway located in the direction of rotation of said member.

8. In a rotor blade for use on rotary wing aircraft of the type having a central gas producing unit, the combination comprising a longitudinally extending member suitable as a rotor blade for a rotary wing aircraft, means on said member for driving the member along a rotary path, said member having a passageway for conducting a heated gas between said gas producing unit and said means, and insulating means for reducing the loss of heat from the gases passing through said passageway, said insulating means being located in said passageway and varying in thickness along the longitudinal extension of said member, and the cross sectional area of said passageway being equal along the longitudinal extension of said member.

References Cited in the file of this patent

UNITED STATES PATENTS

| | | |
|---|---|---|
| 2,674,327 | Pullen et al. | Apr. 6, 1954 |
| 2,818,223 | Doblhoff | Dec. 31, 1957 |

OTHER REFERENCES

Teflon: DuPont DeNemours & Co., Circular No. 1, received U.S. Patent Office August 8, 1952.